(12) United States Patent
Bradford

(10) Patent No.: US 7,765,098 B2
(45) Date of Patent: Jul. 27, 2010

(54) MACHINE TRANSLATION USING VECTOR SPACE REPRESENTATIONS

(75) Inventor: Roger Burrowes Bradford, Great Falls, VA (US)

(73) Assignee: Content Analyst Company, LLC, Reston, VA (US)

( * ) Notice: Subject to any disclaimer, the term of this patent is extended or adjusted under 35 U.S.C. 154(b) by 546 days.

(21) Appl. No.: 11/408,957

(22) Filed: Apr. 24, 2006

(65) Prior Publication Data

US 2006/0265209 A1 Nov. 23, 2006

Related U.S. Application Data

(60) Provisional application No. 60/674,705, filed on Apr. 26, 2005.

(51) Int. Cl.
*G06F 17/27* (2006.01)
*G06F 17/28* (2006.01)
*G06F 17/30* (2006.01)

(52) U.S. Cl. .................. 704/9; 704/2; 707/739
(58) Field of Classification Search .............. 707/4
See application file for complete search history.

(56) References Cited

U.S. PATENT DOCUMENTS

| | | | | |
|---|---|---|---|---|
| 4,839,853 | A | | 6/1989 | Deerwester et al. |
| 5,285,386 | A | * | 2/1994 | Kuo .................. 704/2 |
| 5,301,109 | A | | 4/1994 | Landauer et al. |
| 5,541,838 | A | * | 7/1996 | Koyama et al. ............ 704/4 |
| 5,642,522 | A | * | 6/1997 | Zaenen et al. ............. 715/246 |
| 5,644,774 | A | * | 7/1997 | Fukumochi et al. ......... 704/4 |
| 5,844,798 | A | * | 12/1998 | Uramoto ................. 704/2 |
| 6,044,220 | A | * | 3/2000 | Breternitz, Jr. ............ 717/139 |
| 6,081,775 | A | * | 6/2000 | Dolan ................... 704/10 |
| 6,253,170 | B1 | * | 6/2001 | Dolan ................... 704/10 |
| 6,256,629 | B1 | * | 7/2001 | Sproat et al. ............. 707/6 |
| 6,278,967 | B1 | | 8/2001 | Akers et al. |
| 6,343,266 | B1 | * | 1/2002 | Paul et al. ............... 704/9 |
| 6,393,389 | B1 | * | 5/2002 | Chanod et al. ............ 704/7 |
| 6,760,695 | B1 | * | 7/2004 | Kuno et al. .............. 704/9 |
| 6,996,520 | B2 | | 2/2006 | Levin |

(Continued)

OTHER PUBLICATIONS

Using Structured Queries for Disambiguation in Cross-Language Information Rerieval, Jan. 21, 2002.*

(Continued)

*Primary Examiner*—Neveen Abel Jalil
*Assistant Examiner*—Tarek Chbouki
(74) *Attorney, Agent, or Firm*—Sterne, Kessler, Goldstein and Fox PLLC

(57) ABSTRACT

An embodiment of the present invention provides a method for automatically translating text. First, a conceptual representation space is generated based on source-language documents and target-language documents, wherein respective terms from the source-language and target-language documents have a representation in the conceptual representation space. Second, a new source-language document is represented in the conceptual representation space, wherein a subset of terms in the new source-language document is represented in the conceptual representation space, such that each term in the subset has a representation in the conceptual representation space. Then, a term in the new source-language document is automatically translated into a corresponding target-language term based on a similarity between the representation of the term and the representation of the corresponding target-language term.

6 Claims, 7 Drawing Sheets

U.S. PATENT DOCUMENTS

| | | | |
|---|---|---|---|
| 7,024,407 B2 | 4/2006 | Bradford | |
| 7,124,073 B2* | 10/2006 | Tokuda et al. | 704/2 |
| 7,319,949 B2* | 1/2008 | Pinkham | 704/3 |
| 7,383,542 B2* | 6/2008 | Richardson et al. | 717/137 |
| 2001/0029455 A1* | 10/2001 | Chin et al. | 704/277 |
| 2002/0103799 A1 | 8/2002 | Bradford et al. | |
| 2004/0128122 A1* | 7/2004 | Privault et al. | 704/4 |
| 2004/0260532 A1* | 12/2004 | Richardson et al. | 704/2 |
| 2005/0021322 A1* | 1/2005 | Richardson et al. | 704/2 |
| 2005/0049852 A1* | 3/2005 | Chao | 704/9 |
| 2005/0271156 A1* | 12/2005 | Nakano | 375/265 |
| 2006/0009963 A1* | 1/2006 | Gaussier et al. | 704/7 |
| 2006/0224584 A1 | 10/2006 | Price | |
| 2006/0235661 A1 | 10/2006 | Price | |
| 2006/0253418 A1* | 11/2006 | Charnock et al. | 707/1 |
| 2007/0016401 A1* | 1/2007 | Ehsani et al. | 704/9 |

OTHER PUBLICATIONS

P.F. Brown, et al., "The Mathematics of Statistical Machine Translation: Parameter Estimation," 19 Computational Linguistics 263 (1993).

Klebanov, B., and Wiemer-Hastings, P., 2002, "Using LSA for Pronominal Anaphora Resolution," in Gelbukh, A. (ed.) Computational Linguistics and Intelligent Text Processing, LNCS 2276, Springer Verlag, pp. 197-199.

Deerwester, S., et al., "Indexing by Latent Semantic Analysis," Journal of the American Society for Information Science, 41(6), pp. 391-407, Oct. 1990.

Ding, C., A Similarity-based Probability Model for Latent Semantic Indexing, Proceedings of the 22nd Annual SIGIR Conference, Berkeley, Calif., Aug. 1999.

Marchisio, G., and Liang, J., "Experiments in Trilingual Cross-language Information Retrieval," Proceedings, 2001 Symposium on Document Image Understanding Technology, Columbia, MD, 2001, pp. 169-178.

Hoffman, T., "Probabilistic Latent Semantic Indexing," Proceedings of the 22nd Annual SIGIR Conference, Berkeley, CA, 1999, pp. 50-57.

Kolda, T., and O.Leary, D., "A Semidiscrete Matrix Decomposition for Latent Semantic Indexing in Information Retrieval," ACM Transactions on Information Systems, vol. 16, Issue 4 (Oct. 1998), pp. 322-346.

Landauer, T., et al., in "Learning Human-Like Knowledge by Singular Value Decomposition: A Progress Report," in M.I. Jordan, MJ. Kearns and S.A. Solla (Eds.), Advances in Neural Information Processing Systems 10, Cambridge: MIT Press, pp. 45-51 (1998).

William H. Press et al., "Numerical Recipes," The Art of Scientific Computing, Chapter 2, pp. 52-64, Cambridge University Press, 1986.

D. Arnold et al., "Machine Translation," Chapter 6, pp. 111-128, Blackwell Publishers, Cambridge, MA, 1994.

Teuvo Kohonen, "Self-Organizing Maps," Third Edition, Springer-Verlag Berlin Heidelberg, New York, pp. 105-115 and 191-194.

International Search Report and Written Opinion for PCT/US06/15474, 12 pages, dated Sep. 20, 2007.

Susan T. Dumais, "Latent Semantic Analysis," Annual Review of Information Science and Technology, vol. 38, Information Today, Inc., Medford, New Jersey, 2004, pp. 189-230.

\* cited by examiner

Term by Document Matrix

SVD Extracts Key
Relationships among Terms –
Basis for Conceptual Matching

Singular Value Decomposition (SVD) Operation

Dimensionality Reduction

MACHINE TRANSLATION USING VECTOR SPACE REPRESENTATIONS

CROSS REFERENCE TO RELATED APPLICATIONS

This application claims benefit under 35 U.S.C. §119(e) to U.S. Provisional Patent Application 60/674,705, entitled "System And Method For Improved Machine Translation Using Vector Space Representation," to Bradford, filed on Apr. 26, 2005, the entirety of which is hereby incorporated by reference as if fully set forth herein.

BACKGROUND OF THE INVENTION

1. Field of the Invention

The present invention is generally directed to the field of machine translation.

2. Background

Translation of text from one human language into another is important in many commercial and governmental activities, as well as having personal applications. Translation of text by human translators is time-consuming and expensive. There is a substantial need for automated means of carrying out the translation function. Numerous approaches have been applied in software for automated machine translation. However, as will be described in more detail below, the quality of the output from contemporary machine translation systems is generally well short of desired performance.

Machine translation software converts text from one human language (the source-language) into another (the target-language). Despite 50 years of development, the capabilities of automated machine translation systems are still discouragingly limited, as discussed in *Machine Translation: an Introductory Guide*, NCC Blackwell, London, 1994, ISBN: 1855542-17x. Major approaches applied in machine translation are: (i) rule-based systems; (ii) example-based systems, and (iii) statistical machine translation.

Even for the simplest of language pairs (for example, English and Spanish), complex sentences and idiomatic expressions are often poorly handled. For more difficult language pairs (for example, English and Arabic), the meaning of sentences is often garbled. With the present state-of-the-art, the applicability of machine translation is limited.

A key problem in machine translation is the lack of fidelity with which translated text reflects the meaning and tone of source text. For example, machine translation systems have problems in several areas, including:

1. Word sense disambiguation. In human languages, many words have multiple meanings. For example, the English word "strike" has dozens of common meanings. Examples of poor machine translation typically involve an incorrect choice of word sense.

2. Idiomatic expressions. Better capabilities should be developed to deal with idiomatic expressions, such as "kicked the bucket" or "good as gold."

3. Anaphora resolution. Machine translation systems have difficulties resolving ambiguous references.

4. Logical decomposition. Machine translation systems have difficulties decomposing long sentences into coherent textual elements, particularly for languages such as Arabic.

Therefore, what is needed is a system and method for improving the performance of machine translations. For example, the improvement should more effectively deal with word sense ambiguity, idiomatic expressions, anaphora resolution, and logical decomposition.

BRIEF SUMMARY OF THE INVENTION

In accordance with the present invention there is provided a system and method for improving the performance of machine translations. A conceptual representation afforded by an abstract mathematical vector space (such as, a Latent Semantic Indexing (LSI) space) addresses the machine translation problems by more effectively dealing with, inter alia, word sense ambiguity, idiomatic expressions, anaphora resolution, and logical decomposition.

An embodiment of the present invention provides a method for automatically translating text, including the following steps. First, a conceptual representation space is generated based on source-language documents and target-language documents, wherein respective terms from the source-language and target-language documents have a representation in the conceptual representation space. The conceptual representation space may be, for example, a Latent Semantic Indexing (LSI) space. Second, a new source-language document is represented in the conceptual representation space, wherein a subset of terms in the new source-language document is represented in the conceptual representation space, such that each term in the subset has a representation in the conceptual representation space. In an LSI-based example, the representation of each respective term may be a vector representation. Then, a term in the new source-language document is automatically translated into a corresponding target-language term based on a similarity between the representation of the term and the representation of the corresponding target-language term. In an LSI-based example, the similarity may be a cosine similarity between vector representations.

In an example, the above-mentioned embodiment may include a method for disambiguating words at a word-level, which includes the following additional steps. A disambiguated conceptual representation space is generated for at least one of the source-language documents. In the disambiguated conceptual representation space, a polysemous word contained in the at least one source-language document has a plurality of representations, wherein each representation of the polysemous word corresponds to a sense of that word. A representation of the new source-language document is then generated in the disambiguated conceptual representation space, wherein a subset of terms in the new source-language document is represented in the conceptual representation space, such that each term in the subset has a representation in the disambiguated conceptual representation space. A term in the new source-language document is automatically translated into a corresponding target-language term based on a similarity between the representation of the term and the representation of one of the senses of the polysemous word.

Another embodiment of the present invention provides a method for automatically translating text based on a disambiguation of text at a dictionary-level, including the following steps. First, a conceptual representation space (such as an LSI space) is generated based on source-language documents and target-language documents. Second, a plurality of dictionaries is provided. Third, a representation of each dictionary is generated in the conceptual representation space. Fourth, a new source-language document is represented in the conceptual representation space. Fifth, a first dictionary is selected from the collection of dictionaries based on a similarity between the representation of the first dictionary and the representation of the new source-language document. Then, a term in the new source-language document is automatically translated into a corresponding target-language term based on the first dictionary.

A further embodiment of the present invention provides a method for producing a machine translation of a text passage based on a combination of a plurality of translations of the text passage, including the following steps. First, a conceptual representation space is generated based on a collection of source-language documents and a collection of target-language documents. Second, a plurality of translations of a text passage are provided. The plurality of translations may be received from a conventional translation algorithm, such as a rule-based algorithm, an example-based algorithm, or a statistical machine translation algorithm. Third, a representation of each translation is generated in the conceptual representation space. Then, the text passage is automatically translated based on similarity comparisons among the representations of the translations.

A further embodiment of the present invention provides a method for generating a parallel corpus of documents, including the following steps. First, a conceptual representation space is generated based on a collection of source-language documents and a collection of target-language documents. Each target-language document in the collection of target-language documents comprises a translation of a source-language document in the collection of source-language documents. Second, a new collection of documents is provided, including both source-language documents and target-language documents. Third, a representation of each document in the new collection of documents is generated in the conceptual representation space. Fourth, a collection of parallel documents is identified based on similarity comparisons among the representations in the conceptual representation space. Then, the collection of source-language documents and the collection of target-language documents are combined with the collection of parallel documents resulting in a combined collection of documents, and a new conceptual representation space is generated based on the combined collection of documents, wherein the new conceptual representation space is stored in an electronic format.

A further embodiment of the present invention provides a method for automatically translating text, including the following steps. First, a conceptual representation space is generated based on source-language documents and target-language documents, wherein respective terms from the source-language documents and the target-language documents have a representation in the conceptual representation space. Second, a similarity is measured between at least one pair of terms based on the representations of terms included in the at least one pair of terms, wherein the at least one pair of terms includes a term from at least one of the source-language documents and a term from at least one of the target-language documents. Third, the similarity is converted to an association probability. Then, the association probability is used as an estimate of a parameter in a statistical translation algorithm.

Techniques in accordance with embodiments of the present invention provide several advantages over other techniques, including the example advantages listed below.

1. A method in accordance with an embodiment of the present invention generates conceptual representation spaces that deal with character strings and thus are inherently independent of language. Hence, techniques in accordance with embodiments of the present invention can be applied to all combinations of source and target-languages, and are independent of genre and subject matter.

2. An embodiment of the present invention can be used for creating conceptual representation spaces that are generated from large collections of documents, thus capturing detail of languages in a manner much more efficient than human construction.

3. Since methods in accordance with embodiments of the present invention are based on machine learning principles, the conceptual representation spaces generated by these methods may be continuously and automatically updated with new data, thus keeping pace with changes in language.

4. A method in accordance with the embodiments of the present invention can deal directly with terms that are not actual words, such as abbreviations and acronyms.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figures 1, 2:
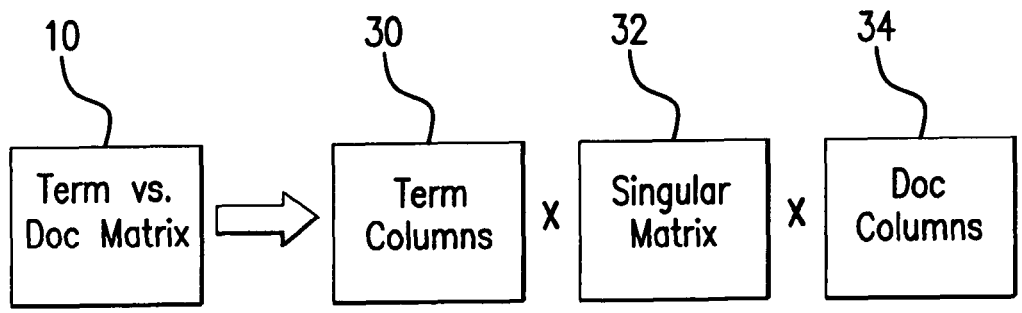
FIG. 1 illustrates formation of the term by document matrix used in embodiments of the present invention.
FIG. 2 illustrates decomposition of the term by document matrix of the present invention into three constituent matrices.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

As is described in more detail herein, according to an embodiment of the present invention there is provided a method and system for improving machine translation of text. A conceptual representation afforded by an abstract mathematical vector space addresses the machine translation problems by more effectively dealing with word sense ambiguity, idiomatic expressions, anaphoric resolution, statistical machine translation and logical decomposition.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As used herein, a "term" shall mean any string of characters, including letters, numbers, symbols, and other similar characters. An example of a term can include, but is not limited to, a word, a collection of words, a word stem, a collection of word stems, a phrase, an acronym, an alphanumeric designator, an entity name, and similar strings of characters and combinations thereof. It is to be appreciated that the word "term" as used herein may refer to a string of characters in any human language, computer language, or other similar language comprised of strings of characters.

Embodiments of the present invention are described below in terms of a particular abstract mathematical space called a Latent Semantic Indexing (LSI) space. This is for illustrative purposes only, and not limitation. It will be apparent to a person skilled in the relevant art(s) from the description contained herein how to implement embodiments of the present invention in other abstract mathematical spaces.

II. Overview

Methods have been developed for generating vector space representations of language that demonstrably capture aspects of the conceptual content of text. For example, one of these techniques is called latent semantic indexing (LSI), an implementation of which is described below in Section III and in U.S. Pat. No. 4,839,853 (the '853 patent), entitled "Computer Information Retrieval Using Latent Semantic Structure" to Deerwester et al., the entirety of which is incorporated by reference herein.

The LSI technique can automatically process arbitrary collections of text and generate a high-dimensional vector space in which both text objects (generally documents) and terms are distributed in a fashion that reflects their meaning. An extension of this technique allows processing of phrases. Experiments have demonstrated a striking similarity between some aspects of the text processing in the LSI representation space and human processing of language, as discussed by Landauer, T., et al., in "Learning Human-Like Knowledge by Singular Value Decomposition: A Progress Report," in M. I. Jordan, M J. Kearns and S. A. Solla (Eds.), Advances in Neural Information Processing Systems 10, Cambridge: MIT Press, pp. 45-51 (1998), the entirety of which is incorporated by reference herein.

Other techniques have also been developed that generate high-dimensional vector space representations of text objects and their constituent terms, for example, as described in the following references: (i) Marchisio, G., and Liang, J., "Experiments in Trilingual Cross-language Information Retrieval," Proceedings, 2001 Symposium on Document Image Understanding Technology, Columbia, Md., 2001, pp. 169-178; (ii) Hoffman, T., "Probabilistic Latent Semantic Indexing," Proceedings of the $22^{nd}$ Annual SIGIR Conference, Berkeley, Calif., 1999, pp. 50-57; (iii) Kohonen, T., "Self-Organizing Maps," $3^{rd}$ Edition, Springer-Verlag, Berlin, 2001; and (iv) Kolda, T., and O. Leary, D., "A Semidiscrete Matrix Decomposition for Latent Semantic Indexing Information Retrieval," ACM Transactions on Information Systems, Volume 16, Issue 4 (October 1998), pp.322-346. The entirety of each of these is incorporated by reference herein. In the present application, the conceptual representation spaces generated by LSI or any of the other foregoing techniques will be referred to generally as "conceptual representation spaces."

An embodiment of the present invention is premised on the recognition that, at a fundamental level, properties of a conceptual representation space provide a mechanism for facilitating machine translation. In a conceptual representation space, terms that are similar in meaning have associated vector representations that are close together in the space. In an embodiment of the present invention, a conceptual representation space is generated based on source-language documents and target-language documents. An example method for generating such a conceptual representation space is described below in Section IV and in U.S. Pat. No. 5,301,109 (the '109 patent), entitled "Computerized Cross-language Document Retrieval Using Latent Semantic Indexing" to Landauer et al., the entirety of which is incorporated by reference herein. In such a space, terms in one language have vector representations that are close to the vector representations for terms of similar meaning in other language(s). An embodiment of the present invention exploits this fact to improve machine translation by: (1) creating a cross-lingual conceptual representation space for a source-language and a target-language; and (2) translating terms in a source text based on a similarity (such as, a closeness) with terms of the target-language in the conceptual representation space.

The above-described method can be used on its own or as a supplement to source-language to target-language mappings generated via other means (such as, from a bilingual dictionary). For example, an extension of the above-described method can be used to improve automatic machine translation of text while accounting for word sense disambiguation at the dictionary level or at the word level, as described in Sections VI and VII, respectively. Terms that are translated may include words, acronyms, abbreviations, and idiomatic expressions, as described in Section VIII. Alternative embodiments are described in Section IX, including anaphora resolution, logical decomposition, data fusion, statistical machine translation, and boot-strapping (to generate a parallel corpus of documents). Then, an example computer system is described in Section X, which computer system may be used to implement methods in accordance with embodiments of the present invention.

III. Overview of Latent Semantic Indexing

A. Introduction

Before discussing details of embodiments of the present invention, it is helpful to present a motivating example of LSI, which can also be found in U.S. Pat. No. 7,024,407, entitled "Word Sense Disambiguation" to Bradford, the entirety of which is incorporated by reference herein. This motivating example is used to present an overview of the LSI technique and how it may be used to generated a disambiguated LSI space and/or a cross-lingual conceptual representation space, as described in Section IV.

To generate an LSI vector space, the following pre-processing steps may be applied to the text. First, frequently-occurring words (such as "the," "and," "of," and similar words) may be removed. Such frequently-occurring words, typically called "stop words," have little contextual discrimination value. Second, certain combinations of terms (such as, United States) may be treated as phrases. Third, hyphenated terms may be split into separate terms. Fourth; a process, known as word stemming, may be applied in which a word is reduced to its root form. For example, the words "clears," "cleared," and "clearing" would all be reduced to the stem "clear." The extent to which any or all of these four preprocessing steps are applied will depend on the application.

Although other vector space representations could be used in accordance with embodiments of the present invention, the technique of Latent Semantic Indexing (LSI) provides a vector space that is desirable in key respects. The LSI technique (including singular value decomposition and dimensionality reduction as described herein) provides a method for extracting semantic information that is latent in a collection of text that is susceptible to a high degree of automation. This technique can create a full index (that is, an LSI vector space) of a collection of documents without significant human intervention. The LSI technique is described in Deerwester, S., et al., "Indexing by Latent Semantic Analysis," Journal of the American Society for Information Science, 41(6), pp. 391-407, October, 1990 and in U.S. Pat. No. 4,839,853 (the '853 patent). The entirety of each of these references is incorporated by reference herein. The optimality of this technique is shown in Ding, C., A Similarity-based Probability Model for Latent Semantic Indexing, Proceedings of the 22nd Annual SIGIR Conference, Berkeley, Calif., August, 1999. The LSI technique has been shown to be of considerable value as an approach to text retrieval.

The LSI technique starts with a collection of text passages, typically referred to in the literature as documents. The term document in this case may refer to paragraphs, pages, or other subdivisions of text and not necessarily to documents in the usual sense, i.e., externally defined logical subdivisions of text. For simplicity, this disclosure follows the standard convention of referring to the text passages of interest as documents. The disclosure uses term and word interchangeably as elements of documents.

The use of LSI is illustrated with reference to FIG. 1. As a first step, a large sparse matrix 10 is formed. The matrix 10 is typically referred to as a term-by-document matrix (T by D matrix, for short), which has a dimension m x n, where m is equal to the number of unique terms considered and n equals the number of documents considered. Each row (such as row 12) in the T by D matrix 10 corresponds to a term that appears in the documents of interest, and each column (such as column 14) corresponds to a document. Each element (i, j) in the matrix corresponds to the number of times that the term corresponding to row i occurs in the document corresponding to column j. For example, in FIG. 1, "able" appears one time in Doc #1 and "acid" appears two times in Doc #2.

Figure 3:
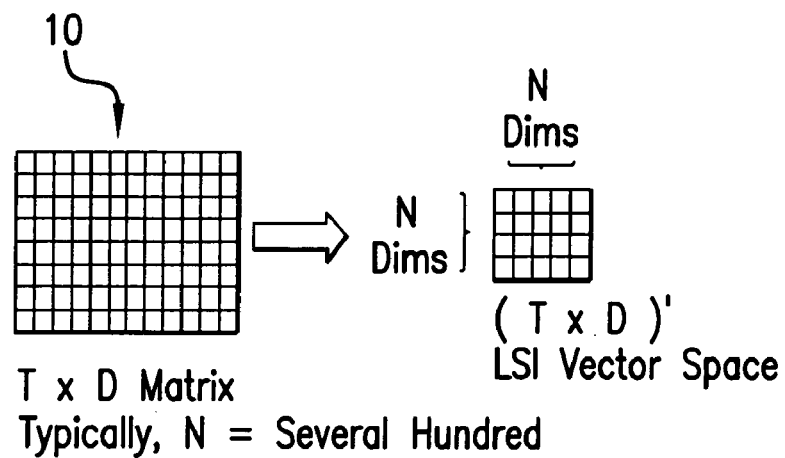
FIG. 3 illustrates formation of the LSI matrix used in an embodiment of the present invention.

Referring to FIG. 2, a known technique of singular value decomposition (SVD) can be used to decompose the T by D matrix to a product of three matrices—namely, a term matrix 30, a singular value matrix 32, and a document matrix 34. The singular value matrix 32 has non-zero values only on the diagonal. Small values on this diagonal, and their corresponding rows and columns in the term matrix 30 and column matrix 34 are then deleted. This truncation process is used to generate a vector space of reduced dimensionality as illustrated in FIG. 3 by recombining the three truncated matrices into (T by D)' matrix. The relationship between the position of terms and documents in this new vector space are subject to the same properties as in the original vector space.

B. General Model Details

It is now elucidating to describe in somewhat more detail the mathematical model underlying the latent structure, singular value decomposition technique.

Any rectangular matrix Y of t rows and d columns, for example, a t-by-d matrix of terms and documents, can be decomposed into a product of three other matrices:

$$Y_0 = T_0 S_0 D_0^T \quad (1)$$

such that $T_0$ and $D_0$ have unit-length orthogonal columns (i.e. $T_0^T T_0 = I$; $D_0^T D_0 = I$) and $S_0$ is diagonal. This is called the singular value decomposition (SVD) of Y. A procedure for SVD is described in the text "Numerical Recipes," by Press, Flannery, Teukolsky and Vetterling, 1986, Cambridge University Press, Cambridge, England, the entirety of which is incorporated by reference herein. $T_0$ and $D_0$ are the matrices of left and right singular vectors and $S_0$ is the diagonal matrix of singular values. By convention, the diagonal elements of $S_0$ are ordered in decreasing magnitude.

With SVD, it is possible to devise a simple strategy for an optimal approximation to Y using smaller matrices. The k largest singular values and their associated columns in $T_0$ and $D_0$ may be kept and the remaining entries set to zero. The product of the resulting matrices is a matrix $Y_R$ which is approximately equal to Y, and is of rank k. The new matrix $Y_R$ is the matrix of rank k which is the closest in the least squares sense to Y. Since zeros were introduced into $S_0$, the representation of $S_0$ can be simplified by deleting the rows and columns having these zeros to obtain a new diagonal matrix S, and then deleting the corresponding columns of $T_0$ and $D_0$ to define new matrices T and D, respectively. The result is a reduced model such that $$Y_R = TSD^T. \quad (2)$$

The value of k is chosen for each application; it is generally such that $k \geq 100$ for collections of 1000-3000 data objects.

C. Example Similarity Comparisons

For discussion purposes, it is useful to interpret the SVD geometrically. The rows of the reduced matrices T and D may be taken as vectors representing the terms and documents, respectively, in a k-dimensional space. These vectors then enable the mathematical comparisons between the terms or documents represented in this space. Typical comparisons between two entities involve a dot product, cosine or other comparison between points or vectors in the space or as scaled by a function of the singular values of S. For example, if $d_1$ and $d_2$ respectively represent vectors of documents in the D matrix, then the similarity between the two vectors (and, consequently, the similarity between the two documents) can be computed as any of: (i) $d_1 \cdot d_2$, a simple dot product; (ii) $(d_1 \cdot d_2)/(\|d_1\| \times \|d_2\|)$, a simple cosine; (iii) $(d_1 S) \cdot (d_2 S)$, a scaled dot product; and (iv) $(d_1 S \cdot d_2 S)/(\|d_1 S\| \times \|d_2 S\|)$, a scaled cosine.

Mathematically, the similarity between representation $d_1$ and $d_2$ can be represented as $<d_1 | d_2>$. Then, for example, if the simple cosine from item (ii) above is used to compute the similarity between two vectors, $<d_1 | d_2>$ can be represented in the following well-known manner:

$$\langle d_1 | d_2 \rangle = \frac{d_1 \cdot d_2}{\|d_1\| \|d_2\|} = \frac{1}{\|d_1\| \|d_2\|} \left[ \sum_{i=1}^{k} d_{1,i} \cdot d_{2,i} \right], \quad (3)$$

where $d_{1,i}$ and $d_{2,i}$ are the components of the representations $d_1$ and $d_2$, respectively.

D. Folding in Documents

It is often useful to generate a representation of a document in the LSI space, even when that document is not used to generate the LSI space. The process of representing a document in an LSI space is often referred to as "folding" the document into the LSI space. The mathematical details for this process are the same whether the document is an existing document in the LSI space or a new document that is to be represented in the LSI space.

One criterion for such a derivation is that the insertion of a real document $Y_i$ should give $D_i$ when the model is ideal (i.e., $Y=Y_R$). With this constraint, $$Y_q = TSD_q^T \qquad (4)$$

Multiplying both sides of equation (4) by the matrix $T^T$ on the left, and noting that $T^T T$ equals the identity matrix, yields, $$T^T Y_q = SD_q^T.$$

Multiplying both sides of this equation by $S^{-1}$ and rearranging yields the following mathematical expression for folding in a document:

$$D_q = Y_q^T T S^{-1}. \qquad (5)$$

Thus, with appropriate rescaling of the axes, folding a document into the LSI space amounts to placing the vector representation of that document at the scaled vector sum of its corresponding term points.

As a prerequisite to folding a document into an LSI space, at least one or more of the terms in that document must already exist in the term space of the LSI space. The location of a new document that is folded into an LSI space ("the folded location") will not necessarily be the same as the location of that document had it been used in the creation of the LSI space ("the ideal location"). However, the greater the overlap between the set of terms contained in that document and the set of terms included in the term space of the LSI space, the more closely the folded location of the document will approximate the ideal location of the document.

E. Folding in Terms

Similar to documents, the process of representing a term in an LSI space is often referred to as "folding" the term into the LSI space. The mathematical details for this process are the same whether the term is an existing term in the LSI space or a new term that is to be represented in the LSI space.

Folding a term into the LSI space is similar to folding a document into the LSI space. The basic criterion is that the insertion of a real term into $Y_i$ should give $T_i$ when the model is ideal (i.e., $Y=Y_R$). With this constraint, $$Y_q = T_q SD^T. \qquad (6)$$

Multiplying both sides of equation (6) by the matrix D, and noting that $D^T D$ equals the identity matrix, yields $$Y_q D = T_q S. \qquad (7)$$

Multiplying both sides of equation (7) by $S^{-1}$ and rearranging yields the following mathematical expression for folding in a term:

$$T_q = Y_q D S^{-1}. \qquad (8)$$

Thus, with appropriate resealing of the axes, perturbing an LSI space to fold a term into the LSI space amounts to placing the vector representation of that term at the scaled vector sum of its corresponding document points.

As a prerequisite to folding a term into an LSI space, at least one or more of the documents using that term must already exist in the document space of the LSI space. Similar to documents, the location of a new term that is folded into an LSI space ("the folded location") will not necessarily be the same as the location of that term had it been used in the creation of the LSI space ("the ideal location"). However, the greater the number of documents in the LSI space that use that term, the more closely the folded location of the term will approximate the ideal location of the term.

IV. Multi-Language Case

To extend the principles of LSI to cross-language retrieval, a document set comprising all documents of interest, in the languages to be searched, is formed. A subset of the documents, called the "training set," is selected; the "training set" is composed of documents for which translations exist in all the languages (two or more). The so-called "joint" term-by-document matrix of this set is composed from the addition of the terms in their renditions in all the languages. This joint matrix differs from the single-language LSI matrix in that each column, which represents a single multi-language document, is the combination of terms from the two (or more) languages coalesced into just a single column vector. As with the single-language technique, the joint matrix is then analyzed by singular value decomposition. The resulting representation defines vectors for the training-set terms and documents in the languages under consideration. Once the training analysis has been completed, other single-language documents can be "folded in" as pseudo-documents on the basis of terms from any one of the original languages alone. Most importantly, a user query is treated as such a new document.

In the derived indexing space there is a point representing each term in the training set. A new single-language document is assigned a point in the same space by putting it at an appropriate average of the location of all the terms it contains. For cross-language retrieval, the same number or greater of dimensions are kept as would be required to represent the collection in a single language. As outlined above, full or partial equivalence (in the sense that one term will have the same or similar effect in referencing documents as another) is induced between any two or more terms approximately to the extent that their pattern of use, or the overall pattern of association between other terms with which they co-occur, is similar across documents in the training set. Equivalent or nearly equivalent terms in different languages would, of course, be expected to be distributed in nearly the same way in a set of documents and their translations. Thus, the location of two or more equivalent terms in different languages should be almost the same in the resulting representation. Consequently, a document folded in by terms in one language is retrieved by a query containing the appropriate set of words in another language.

A simple example may aid in understanding the general procedure. For this example, a training set of "documents" is composed of four titles, each of which is stated in both English and French.

Training Doc. T1. Effect of falling oil prices on small companies. Les consequences de la chute des prix du petrole pour les petites compagnies.

Training Doc. T2. Low oil prices—Effect on Calgary. La baisse des prix petroliers—Les consequences pour les citoyens de Calgary.

Training Doc. T3. Canadian nuclear power stations—Safety precautions. Les reacteurs nucleaires canadiens—Les precautions prises pour en assurer la securite.

Training Doc. T4. Safety standards for nuclear power plants—Swedish call for international conference. Les normes de securite en matiere de centrales nucleaires—L'appel de la Suede en faveur d'une conference internationale.

First the 55 (20 English-only, 32 French-only, and 3 both) joint term-by-four document training matrix formed from these "documents" is constructed, as partially depicted in Table 1; this table shows the first six English-only words, the three words shared by both languages, and the the last three French-only words. It is this joint matrix that will be decomposed by SVD.

TABLE 1

| TERMS | DOCUMENTS | | | |
|---|---|---|---|---|
| | T1(e1, f1) | T2(e2, f2) | T3(e3, f3) | T4(e4, f4) |
| effect | 1 | 1 | 0 | 0 |
| of | 1 | 0 | 0 | 0 |
| falling | 1 | 0 | 0 | 0 |
| oil | 1 | 1 | 0 | 0 |
| prices | 1 | 1 | 0 | 0 |
| on | 1 | 1 | 0 | 0 |
| Calgary | 0 | 2 | 0 | 0 |
| precautions | 0 | 0 | 2 | 0 |
| conference | 0 | 0 | 0 | 2 |
| d | 0 | 0 | 0 | 1 |
| une | 0 | 0 | 0 | 1 |
| internationale | 0 | 0 | 0 | 1 |

As is apparent from the joint term-by-document training matrix of Table 1, each document is composed of all the terms in both French and English, i.e. the addition of terms from each document including its translation(s). For instance, since the term "precautions" appears as the same term in both the English and French versions, there is an entry of "2" under title T3 in the "precautions" row. As suggested by the foregoing illustrative example, the general procedure for formulating the joint term-by-document matrix for the multi-language case is as follows:

(1) for each document in the training set written in an original language, translate this document into all the other languages. (In the above example, each of the four training documents is in English, which is considered the original language, and each is translated to one other language, namely, French);

(2) each original document plus all of the other translations of each original document are parsed to extract distinct terms composing the multi-language documents. These terms define a database designated the lexicon database, and this database is stored in a memory of a computer. The lexicon database is used in constructing the general joint term-by-document matrix as presented below. (In the above example, the first document contained eight (8) distinct English terms and twelve (12) distinct French terms—"les" is repeated; the second document contains only two (2) more distinct English terms not contained in the first English document, namely, "low" and "Calgary". The terms "oil", "prices", "effect", and "on" are already in the lexicon database as a result of parsing the first English document. Continued parsing in this manner results in the fifty-five (55) distinct terms presented above, namely, 20 English-only, 32 French-only and 3 terms common to both languages.)

(3) the distinct terms from the lexicon database are then treated as being listed in a column, such as the TERMS column in Table 1, as an aid in preparing the joint term-by-document matrix; this column contains t rows. Each training document, composed of both the original as well as all translations, is assigned one column in the joint matrix; if there are d training documents, then there are d columns. Any (i,j) cell in the joint term-by-document matrix, that is, the intersection of the $i^{th}$ "term" row with the $j^{th}$ "document" column contains a tabulation of the frequency of occurrence of the term in the $i^{th}$ row with the document assigned to the $j^{th}$ column. (In the example, training document T2 is shown to have a tabulation of 1 in the row with the term "effect" since it appears only once in the coalesced or merged English and French versions of the document. In contrast, there is an entry of 2 in the row with the term "Calgary" since it appears twice in the documents of T2, namely, once in the English document and once in the French document.)

It is important to understand that it is not necessary to use all available documents to compose the training set. One useful test for the number of documents to include in the training set is the satisfactory retrieval of a document written in one language as determined by inputting the terms of the document as a query in another language. One illustrative test for the sufficiency of the training set will be presented below after the joint term-by-document matrix is decomposed. Also, it is important to realize that some retrieval situations will not require assigning all terms obtained during the parsing step to the lexicon database. A test of what terms to assign to the database is again the satisfactory retrieval of a document written in one language as determined by inputting the terms of the document as a query in another language.

By way of terminology, the generalization of a "document" is called a "data object," to include applications such as graphics-type information as well as text. Moreover, the coalesced version of all translations of a data object as well as the original data object is called a merged data object.

The results of the decomposition are shown in Table 2, Table 3, and Table 4 for two dimensions.

TABLE 2

| TERM MATRIX (55 terms by 2 dimensions) | | |
|---|---|---|
| effect | 0.0039 | −0.1962 |
| of | 0.0042 | −0.2550 |
| falling | 0.0042 | −0.2550 |
| oil | 0.0039 | −0.1962 |
| prices | 0.0039 | −0.1962 |
| on | 0.0039 | −0.1962 |
| Calgary | 0.0056 | −0.2178 |
| precautions | 0.0451 | −0.0036 |
| conference | 0.3299 | 0.0124 |
| d | 0.2081 | 0.0078 |
| une | 0.2081 | 0.0078 |
| internationale | 0.2081 | 0.0078 |

TABLE 3

| DOCUMENT MATRIX (4 documents by 2 dimensions) | | |
|---|---|---|
| T1 | 0.0200 | −0.8799 |
| T2 | 0.0169 | −0.4743 |
| T3 | 0.1355 | −0.0079 |
| T4 | 0.9904 | 0.0269 |

TABLE 4

| DIAGONAL (2 singular values) | |
|---|---|
| 3.2986 | 2.3920 |

Figure 4:
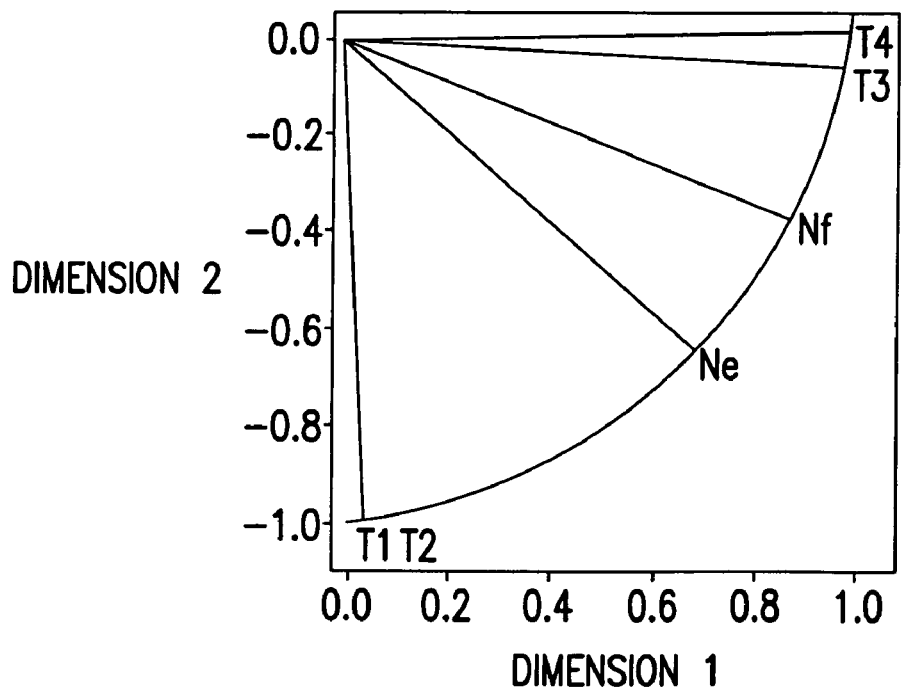
FIG. 4 illustrates the location of the training documents in the data object space for an example reduced to two dimensions in a dual language example.

FIG. 4 shows the location of the four training documents in this space. Since the angle of the coordinates representative of each document is the important parameter for search purposes and the absolute magnitude of the coordinates of each document is relatively unimportant for search purposes, the magnitude of each document has been normalized to unit magnitude for clarity of presentation.

Next, all single-language documents are folded into the space derived from the training set. Each remaining document is folded into the resulting space separately in its English and French versions, i.e. using only English terms and then only French terms in the pseudo-document representation of equation (5): for instance, New Doc Ne. Ontario—Premier's rejection of further nuclear power plants. (Absolute coordinates of 0.0695,-0.0708)

New Doc Nf. L'ontario—le refus du premier ministre de favoriser la construction d'autres centrales nucleaires. (Absolute coordinates of 0.1533,-0.0775)

As shown, the English-only and French-only versions, Ne and Nf, end up close ("similar") to one another and well separated from the other text items in the space. In fact, for a search angle of approximately plus/minus 26 degrees (cosine of 0.90), each document falls within the angle of similarity of the other document. The degree of similarity or closeness of corresponding documents folded into the semantic space after training is used as a test for the sufficiency of the set of data objects selected to train the semantic space. For instance, after training, if a set of documents like Ne and Nf does not fall within a pre-selected angle of similarity, then it may be necessary to re-train the semantic space in order to meet the prescribed retrieval criterion/criteria—for the illustrative case, a single criterion is falling within the angle of search. Typically, paragraphs of 50 words or more from 500 or more multi-language documents are suitable to train the semantic space.

V. An Example Embodiment

Figure 5:
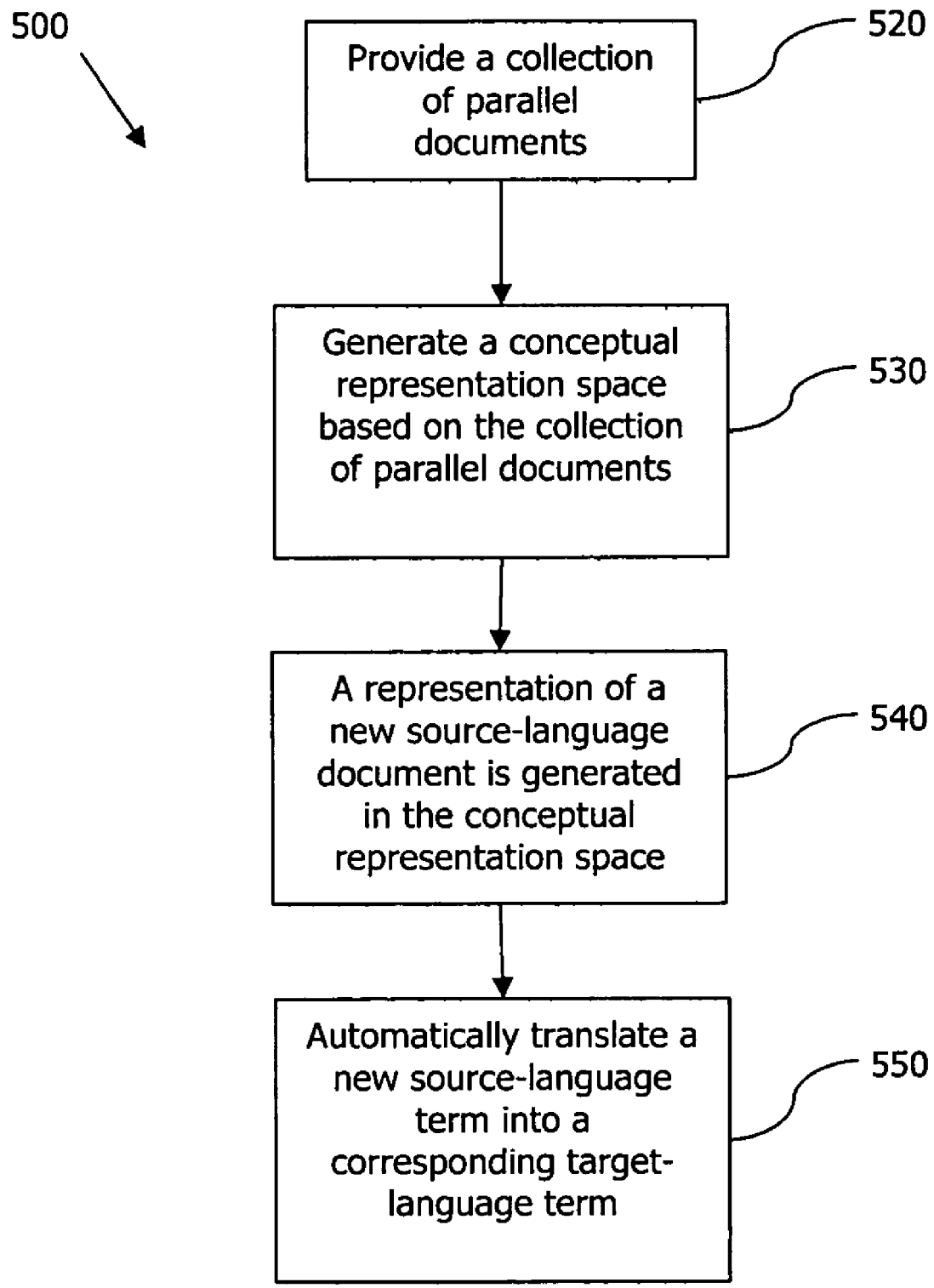
FIG. 5 depicts a flowchart of a method for automatically translating text in accordance with an embodiment of the present invention.

Referring to FIG. 5 there is depicted a flowchart of a method 500 for automatically translating text in accordance with an embodiment of the present invention. Method 500 begins at a step 520 in which a collection of parallel documents is provided—that is, a collection of documents for which each document has a source-language version and a target-language version. Each target-language document (such as, English) is a translation of a source-language document (such as, Arabic). In addition, the source-language documents can be translated into more than one target-language.

In a step 530, a conceptual representation space is generated based on terms in the parallel collection of documents. For example, the conceptual representation space may be generated in accordance with the LSI technique, an implementation of which is described above and in commonly-owned U.S. Pat. No. 4,839,853 entitled "Computer Information Retrieval Using Latent Semantic Structure" to Deerwester et al., the entirety of which is incorporated by reference herein. Additionally or alternatively, the conceptual representation space may be generated in accordance with a mulit-lingual method as described above and in U.S. Pat. No. 5,301,109, entitled "Computerized Cross-language Document Retrieval Using Latent Semantic Indexing." Step 530 can also be performed using alternative techniques or combinations thereof for generating a conceptual representation space.

In a step 540, a representation of a new source-language document (that is, a document that is to be translated) is generated in the conceptual representation space. For example, the new source-language document may be folded-in to the conceptual representation space as described above. The source-language document is parsed to determine the terms in the document. Generating the conceptual representation space (step 530) will afford many of the terms with a vector representation in that space. However, new terms may be present in the source-language document that do not already have a vector representation in the conceptual representation space. A vector representation can be established for these new terms. A potential meaning of each new term can be inferred from the term's vector representation in the conceptual representation space.

In a step 550, a term in the source-language document of step 540 is automatically translated into a corresponding term in a target-language document based on a similarity between the representation of the term in the source-language document and the representation of the corresponding target-language term. The similarity can be measured using any similarity metric defined on the conceptual representation space. Examples of similarity metrics include, but are not limited to, a cosine measure, a dot product, an inner product, a Euclidean distance measure, or some other similarity measure as would be apparent to a person skilled in the relevant art(s). Step 550 can be repeated for each term in the source-language document that is to be translated.

VI. Word Sense Disambiguation at a Dictionary Level

As will be described in more detail below, an embodiment of the present invention can address word sense disambiguation at a dictionary level.

One of the primary sources of error in machine translation is the selection of a wrong sense of a word. For example, in an article about military operations, the word "tank" can have a different meaning than the same word in an article about automobiles. Some commercial machine translation systems allow a user to choose different dictionaries depending on the subject matter being translated. These dictionaries provide the most common translations of words within the context of their specified subject matter. Thus, while a general-purpose dictionary might provide a translation of "tank" using the sense of container for liquid, a military-specific dictionary would likely provide the sense of armored vehicle. Use of such dictionaries can considerably improve the quality of machine translation. However, there are two key drawbacks of existing implementations.

First, users must manually choose the dictionary to be used. This has drawbacks in terms of cost and time, and may present a problem for a user who has no knowledge of the source-language and may not have any a priori knowledge of the subject matter of an item to be translated. Second, a single dictionary is applied to a complete document or set of documents. This is a significant problem, as many documents treat more than one topic.

Figure 6:
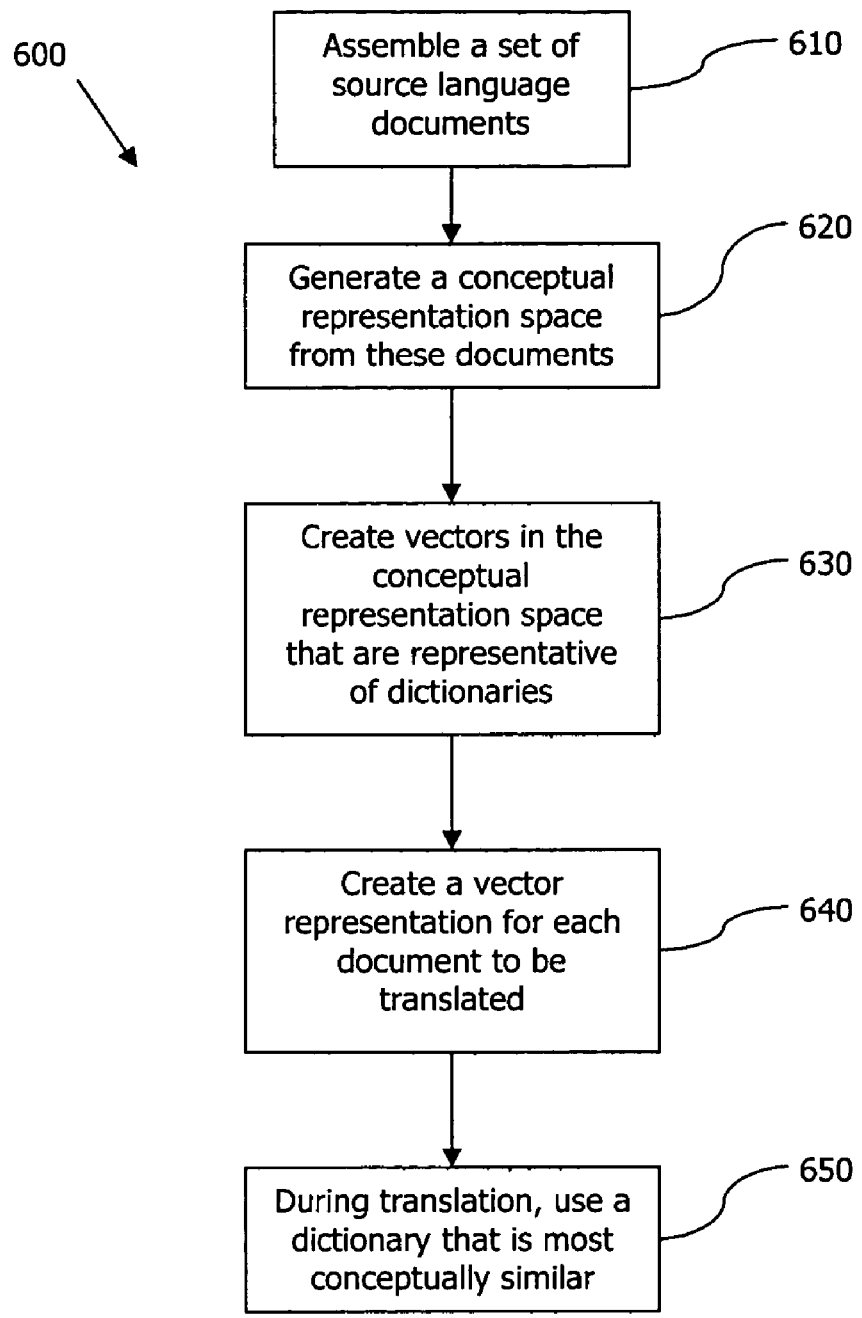
FIG. 6 depicts a flowchart of a method for automatically accounting for word sense disambiguation at a dictionary level in accordance with an embodiment of the present invention.

FIG. 6 depicts a flowchart 600 of a method in accordance with an embodiment of the present invention that uses characteristics of a conceptual representation space to overcome the above-described limitations. As shown in FIG. 6, the method of flowchart 600 begins at a step 610 in which a set of source-language documents is assembled. The assembled documents cover relevant concepts and vocabulary for material that is to be translated.

In a step 620, a conceptual representation space is generated from these documents. For example, the conceptual representation space may be generated in accordance with the LSI technique described above and in detail in commonly-owned U.S. Pat. No. 4,839,853 or by any other known technique for generating a conceptual representation space.

In a step 630, vectors in the conceptual representation space are created that are representative of the dictionaries available to be used in the machine translation process. Step 630 can be implemented using several different methods. For example, in accordance with a first method, for each available dictionary, many or all of the source-language terms and phrases in that dictionary are concatenated into a single text object and a corresponding vector representation is created in a manner consistent with the type of conceptual representation space. For example, in an LSI space, the corresponding vector representation can be created by applying a pseudo-query technique as described in commonly-owned U.S. Pat. No. 4,839,853.

In accordance with a second method for implementing step 630, for each available dictionary, source-language terms and phrases in the dictionary are rationally partitioned. Next, corresponding text objects are created from the source-language terms and phrases in each partition. Then, a corresponding vector representation is created for each text object in a manner consistent with the conceptual representation space.

In accordance with a third method for implementing step 630, translations of some or all of the target-language text from the dictionaries can be used to augment the first or second methods described immediately above.

In accordance with a fourth method for implementing step 630, a cross-lingual conceptual representation space is created. For example, methods analogous to those described in commonly-owned U.S. Pat. No. 5,301,109 may be used to create a cross-lingual conceptual representation space. Then, one or more vector representations are created for each dictionary based on some combination of the source and target-language text contained in the dictionaries. For example, text from a source-language dictionary may be concatenated with text from a target-language dictionary, and a vector representation can be generated for this concatenation.

In a step 640, for each document to be translated, a vector representation for that document is created using an appropriate approach for the particular conceptual representation space being employed.

In a step 650, during translation, apply a dictionary that is most conceptually similar to a document to be translated. For most conceptual representation spaces, the most conceptually similar dictionary can be determined by finding the closest dictionary-related vector to the document vector. In an LSI space, for example, "closeness" can be determined by a cosine measure, or some other similarity measure, defined in the space.

Auxiliary structures other than dictionaries (such as, synonym lists, lists of expansions for acronyms and abbreviations, lists of idiom substitutions, etc.) may be treated in a manner analogous to that described above with reference to flowchart 600. Auxiliary structures for multiple languages can be represented in a single conceptual representation space, thus allowing the above technique to be applied to more than one source-language and/or more than one target-language in a single conceptual representation space.

The method depicted by flowchart 600 does not require a user to manually choose a dictionary to be used. In addition, an extension of the method of flowchart 600 can be used so that a single dictionary is applied to conceptually coherent portions of documents to be translated. For example, commonly-owned U.S. patent application Ser. No. 11/316,837 entitled "Automatic Linear Text Segmentation" to Price, filed Dec. 27, 2005, (the entirety of which is incorporated by reference herein) describes a method for automatically decomposing documents into conceptually cohesive portions. For documents treating more than one topic, this method can be used to identify conceptually coherent portions of the documents. Then, the method of flowchart 600 can be sequentially applied to each of the conceptually coherent portions.

VII. Word Sense Disambiguation at a Word Level

As will be described in more detail below, a method in accordance with an embodiment of the present invention addresses word sense disambiguation at a word level.

Choosing an appropriate dictionary to be used in a machine translation process, as described above, can have a beneficial effect on the quality of the translations produced. However, improvement in translation quality can also be obtained through word sense disambiguation at the word level. An embodiment of the present invention provides a method that uses automated word sense disambiguation in a conceptual representation space to improve machine translation. For example, the automated word sense disambiguation can be achieved by employing a method described in commonly-owned U.S. Pat. No. 7,024,407, entitled "Word Sense Disambiguation" to Bradford, the entirety of which is incorporated by reference herein.

Figure 7:
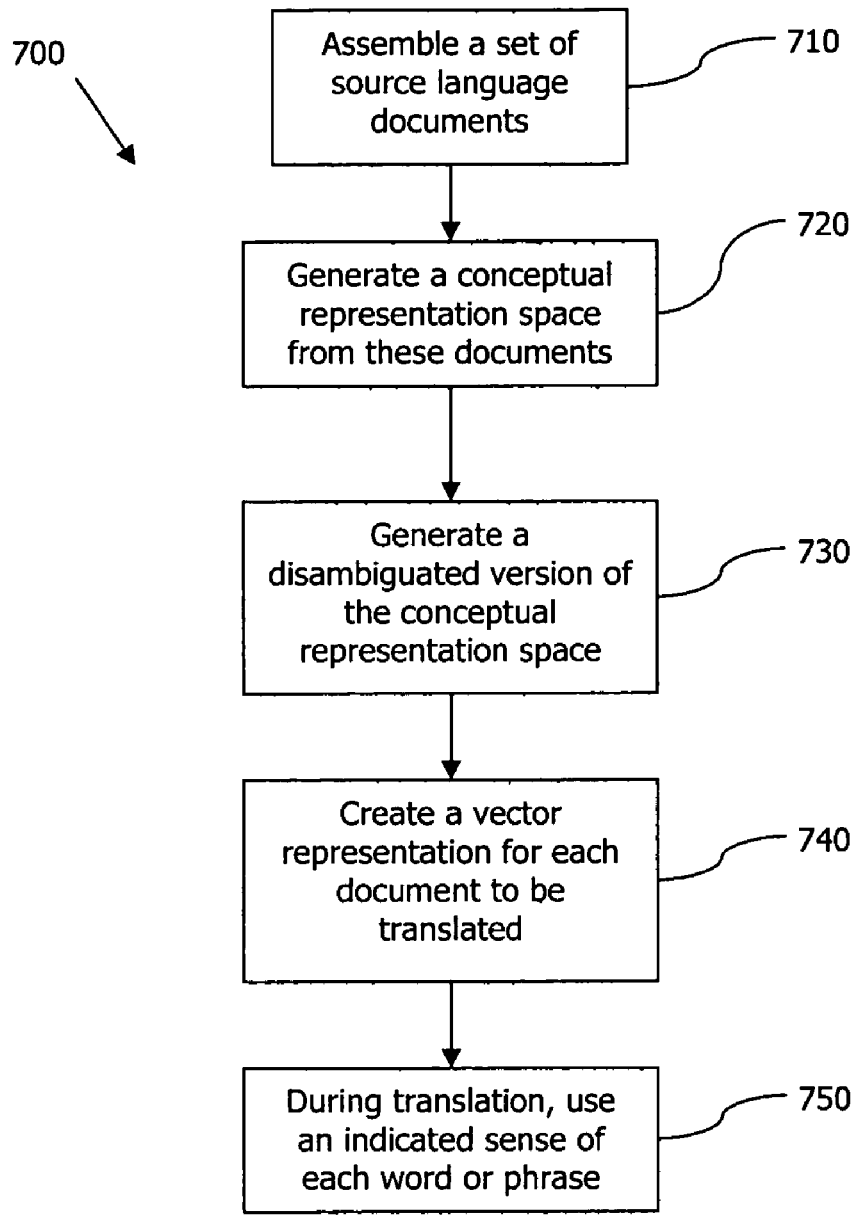
FIG. 7 depicts a flowchart of a method for automatically accounting for word sense disambiguation at a word level in accordance with an embodiment of the present invention.

FIG. 7 depicts a flowchart 700 of a method for disambiguating word sense at a word level. As shown in FIG. 7, flowchart 700 begins at a step 710 in which a set of source-language documents is assembled. The assembled documents cover relevant concepts and vocabulary for material that is to be translated.

In a step 720, a conceptual representation space is generated from these documents using a technique consistent with the type of conceptual representation space. For example, the conceptual representation space can be an LSI space as described above. In this example, the technique for generating the conceptual representation space would be similar to a technique described in U.S. Pat. No. 4,839,853

In a step 730, a disambiguated version of the conceptual representation space is generated. Commonly-owned U.S. Pat. No. 7,024,407, entitled "Word Sense Disambiguation" to Bradford, describes methods for generating disambiguated versions of a conceptual representation space.

In a step 740, for each document to be translated, a vector representation for that document is created in the disambiguated conceptual representation space. This vector representation can be created in a manner consistent with the particular type of conceptual representation space generated in step 720. For example, in an LSI space, this vector representation can be created by application of a pseudo-query technique described in detail in U.S. Pat. No. 4,839,853. In the disambiguated conceptual representation space, this could require iterated disambiguation. That is, a first estimate of the vector representation for the document can be generated based on vector combination of either: (i) the vectors representing the most common senses of polysemous words it contains; or (ii) the vectors representing the averages of the word senses for the polysemous words (that is, the vectors generated in creating the initial conceptual representation space, prior to disambiguation).

Based on the initial vector representation, vectors representing the closest word senses are then chosen for each polysemous word in the document. (For these purposes, a word is polysemous if there is more than one vector representation generated for that word in the disambiguation process of step 730.) A new estimate of the vector representation for the document is generated by vector combination (such as, vector addition, vector averaging, or the like) using these vector representations. This process may have to be repeated until either there is no more change in the calculated vector representation or the changes in that vector are below a threshold.

In a step 750, during translation, the indicated sense of each word or phrase is used in the translation of the polysemous word or phrase in the source document. For example, in applying a bilingual dictionary, the dictionary meaning corresponding to the sense indicated in the conceptual representation space can be used. If the senses are labeled according to a tagging method, step 750 may be implemented by comparing tags and labeled senses in the dictionary. For example, the tagging method can be similar to that described in commonly-owned U.S. Pat. No. 7,024,407, entitled "Word Sense Disambiguation" to Bradford. If a tagging method is not used, step 750 may be implemented by comparing positions in the conceptual representation space of word sense vectors and dictionary entries.

It is to be appreciated that dictionary entries for more than one language can be represented in a single conceptual representation space, allowing this technique to be applied to multiple target-languages using a single conceptual representation space. In addition, it is to be appreciated that the technique of Section V could be applied to a disambiguated conceptual representation space as described in this section.

VIII. Idiomatic Expressions

A difficult problem for machine translation algorithms is the occurrence of idiomatic expressions, such as "raining cats and dogs." Many idiomatic expressions have a standard format, such as "good as gold," or a small number of possible format variants, such as "hold (his/her/one's) horses." A standard feature of conceptual representation spaces is that terms that are similar in meaning (such as, car and automobile) are located close to each other in the conceptual representation space. Phrases can be treated as units in the creation of conceptual representation spaces, as described, for example, in commonly-owned U.S. patent application Ser. No. 09/683,263 entitled "Method for Document Comparison and Selection" to Bradford (Publication No. 2002/0103799 A1), the entirety of which is incorporated by reference herein. In the resulting conceptual representation space, the vector representation for the phrase will be located near words that have meanings similar to the phrase. For example, the representation vectors for LAN and "local area network" will be very close together in a conceptual representation space containing that term and that phrase (provided "local area network" is indexed as a phrase).

Multilingual conceptual representation spaces can be generated using a method as described above and in U.S. Pat. No. 5,301,109. In such multilingual spaces, terms and phrases in one language have vector representations that are close to the vector representations for terms and phrases in the other language that are similar in meaning. This fact provides the basis for an embodiment of the present invention that enables treatment of idiomatic expressions in machine translation systems.

Figure 8:
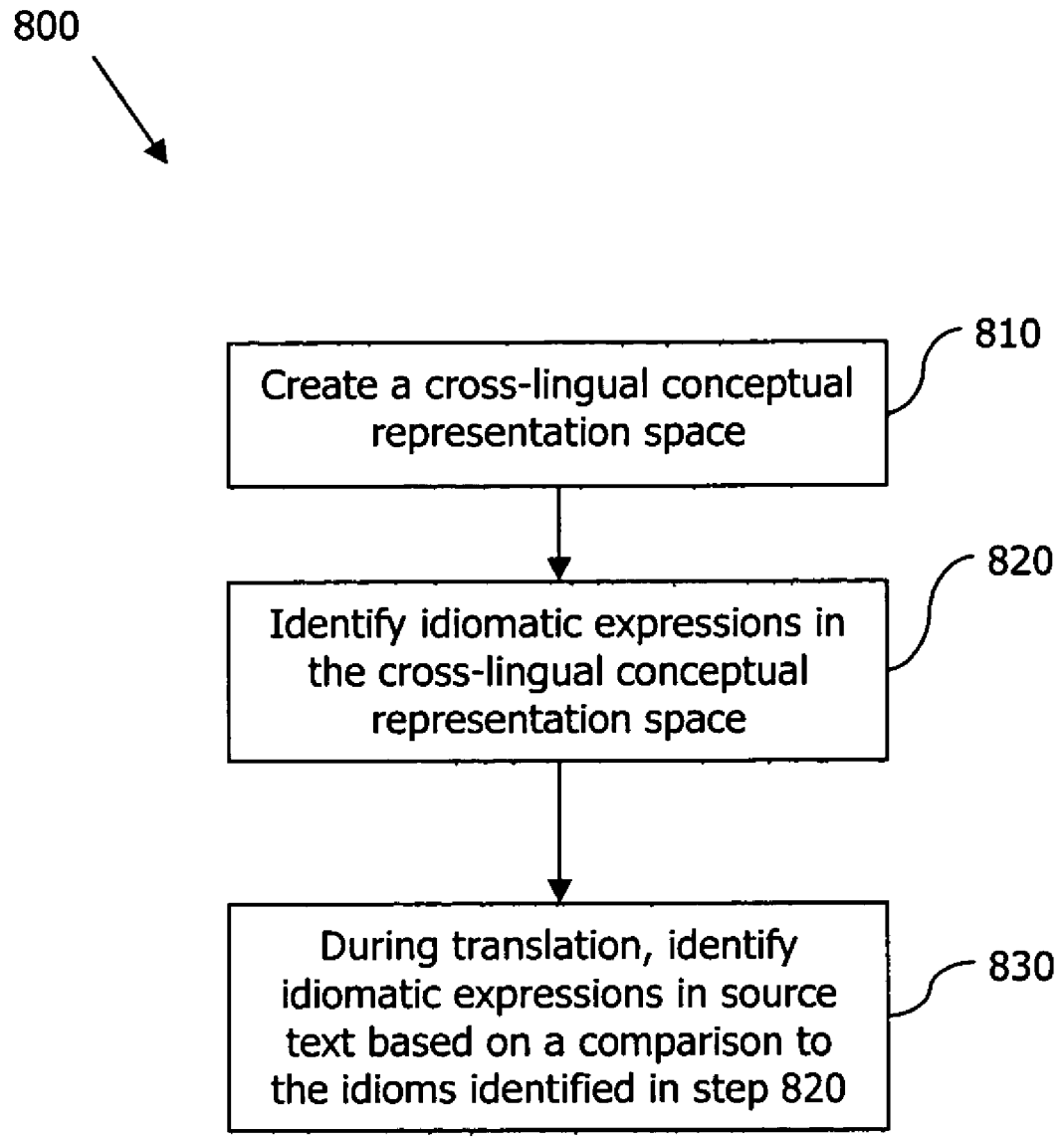
FIG. 8 depicts a flowchart of a method for automatically treating idiomatic expressions in machine translation systems in accordance with an embodiment of the present invention.

FIG. 8 depicts a flowchart 800 of a method for treating idiomatic expressions in a machine translation system in accordance with an embodiment of the present invention. As shown in FIG. 8, the method of flowchart 800 begins at a step 810 in which a cross-lingual conceptual representation space is created for a source and target-language(s). The cross-lingual conceptual representation space may be created, for example, in accordance with a method as described above and in U.S. Pat. No. 5,301,109.

In a step 820, idiomatic expressions are identified in the source-language and treated as phrases. This may be achieved in a number of ways. For example, a list of idiomatic expressions may be available for the language of interest (such as, a list of idiomatic expressions used in English is provided by "The American Heritage Dictionary of Idioms," Houghton Mifflin Company, Boston, 1997). In that case, the list of idiomatic formats is used to determine sequences of words that will be treated as phrases during the pre-processing stage of creating the conceptual representation space. Alternatively, an automated mechanism for identification of idiomatic expressions can be employed. For example, the idiomatic expressions can be automatically identified in the following manner.

First, through statistical analysis of a significant body of source-language material, sequences of words that appear more often than a threshold are identified. For example, the threshold can be heuristically determined. These sequences constitute candidate idiomatic expressions. In general, the number of words in an idiom will be limited in extent. For example, in English, many idiomatic expressions do not exceed five words.

Second, these candidate idiomatic expressions can be iteratively treated as phrases in creating a conceptual representation space (more than one at a time may be treated in a single iteration).

Third, the vector representation for the candidate idiom is compared with the vector representation created by combining the vector representations for the constituent words of that candidate idiom. The combination is carried out in accordance with the standard method applicable to the particular type of conceptual representation space being used. For example, in the case of an LSI space, this can be a weighted average of the constituent vectors, as calculated for a pseudo-object as described in detail in U.S. Pat. No. 4,839,853.

Fourth, if the vector representation for the candidate idiom differs from that of the combined individual words of the candidate by more than a heuristically-determined amount, the candidate is treated as an idiom in further conceptual representation space processing.

Referring back to flowchart 800, in a step 830, during the translation process, idiomatic expressions are identified in the source text through comparison to the list of idiomatic expressions generated in step 820. As such idiomatic expressions are encountered, a similarity metric (such as, proximity) in the conceptual representation space is used to identify likely translations of the idiom into the target-language(s). For example, these likely translations can be words or phrases from the target-language that are close to the vector representation for the source-language idiom in the conceptual representation space.

The effectiveness of the method illustrated by flowchart 800 can be improved by processing idiomatic expressions as described above for both the source-language and the target-language in the same cross-lingual conceptual representation space. Note that the approach described above can be applied to both multiple source-languages and multiple target-languages in a single conceptual representation space.

IX. Alternative Embodiments

A. Anaphora Resolution

As demonstrated in the literature (Klebanov, B., and Wiemer-Hastings, P., 2002, "Using LSA for Pronominal Anaphora Resolution," in Gelbukh, A. (ed.) Computational Linguistics and Intelligent Text Processing, LNCS 2276, Springer Verlag, pp. 197-199), the specific technique of latent semantic indexing (also referred to as latent semantic analysis) has been shown to have potential utility in determining antecedents for pronoun references. An embodiment of the present invention uses conceptual representation spaces to resolve anaphora in the context of a machine translation system.

B. Logical Decomposition

In some languages, such as Arabic, it is not unusual to encounter sentences that are very long in comparison to those typically found in English. Such long sentences present a challenge to machine translation systems. An embodiment of the present invention uses automatic linear text segmentation (an implementation of which is described in commonly-owned U.S. patent application Ser. No. 11/316,837 entitled "Automatic Linear Text Segmentation" to Price, filed Dec. 27, 2005, the entirety of which is incorporated by reference herein) to subdivide lengthy sentences into logically coherent subsets. These subsets can then be translated as individual sentences.

Lengthy sentences may be subdivided in accordance with the following example method. First, all sentences contained in a source-language document (such as Arabic) are identified. The sentences may be identified using off-the-shelf software, such as a utility called "java.text.BreakIterator" provided within the Java™ 2 Platform. However, other well-known methods for determining sentence boundaries (such as identifying all words between punctuation marks) can be used. Second, sentences that are longer than a cut-off value are partitioned into smaller blocks of text, each block containing at least one candidate subject, object, and verb. Third, each such block of text is represented in a conceptual representation space (such as an LSI space). Fourth, conceptual similarity scores are computed for adjacent blocks of text based on the representations of the adjacent blocks of text in the conceptual representation space. In an example in which the conceptual representation space is an LSI space, the conceptual similarity score can be a cosine similarity between the vector representation of adjacent blocks of text. Then, similar adjacent blocks of text are aggregated into conceptually cohesive segments based on the similarity scores. The aggregation process continues so long as aggregation criteria are satisfied.

After the lengthy sentences are subdivided into conceptually cohesive segments, each conceptually cohesive sentence can be automatically translated using methods described herein.

C. Data Fusion

A further embodiment of the present invention combines multiple translation algorithms to produce a result of higher quality than any of the individual translations. This embodiment is one example of an application of data fusion methods in natural language processing and exploits the orthogonality among the errors produced by the individual techniques that are combined. Several different approaches exist for combining outputs from multiple translation algorithms (such as, voting, weighted voting, application of Dempster-Schafer theory of evidence combination, etc.). Properties of a conceptual representation space can provide additional possibilities for such combinations.

An embodiment of the present invention provides a method for combining outputs from multiple translation algorithms. The method includes: (i) for a given text passage (typically a sentence) creating multiple translations from the source-language text to the target-language using different machine translation algorithms; (ii) generating vector representations for each of the multiple translations (for example, an LSI vector representation can be generated); and (iii) choosing words and phrases for the output translated text based on comparisons among the individual vector representations. Step (iii) can be performed in several different ways. For example, a vector representation can be calculated for each possible combination of words and phrases suggested by the individual machine translation outputs. The combination of words and phrases that produces a vector representation closest to the average of the vector representations can be chosen for the individual machine translation outputs.

D. Statistical Machine Translation

Two of the primary current approaches to machine translation are example-based machine translation and statistical machine translation. These approaches make use of parallel corpora, from which statistics about a source-language and a target-language are derived. In accordance with an embodiment of the present invention statistics for example-based machine translation and/or statistical machine translation approaches are derived based on a distribution of words (and phrases) in a multilingual conceptual representation space. These statistics may be more robust than those generated by existing techniques. For example, current approaches to statistical machine translation typically are variations on a technique described in P. F. Brown, et al., "The Mathematics of Statistical Machine Translation: Parameter Estimation," 19 Computational Linguistics 263 (1993) ("the IBM paper"). In their technique, estimates of the degree of association of words in source and target language are determined based upon the statistics of alignments in translated pairs of sentences. In an embodiment of the present invention, proximity of source and target words in a conceptual representation space provides a more powerful indication of such association. This proximity measurement can be converted to an association probability and this probability directly inserted into models such as those described in the IBM paper.

A method in accordance with an embodiment of the present invention uses source-language and target-language statistics derived from a conceptual representation space in an implementation of example-based machine and/or statistical machine translation. The more data (text in the source and target-languages) that is taken into consideration in the generation of these statistics, the better.

E. Boot-Strapping to Create a Parallel Corpus of Documents

A method in accordance with another embodiment of the present invention creates a cross-lingual document space through an iterative process. The method includes the following steps.

In a first step, an initial cross-lingual space is created. The cross-lingual space can be created using known techniques (such as, the technique described in U.S. Pat. No. 5,301,109, entitled "Computerized Cross-language Document Retrieval Using Latent Semantic Indexing," which issued Apr. 5, 1994).

In a second step, a quantity of documents in the languages of the cross-lingual space is collected. It is to be appreciated that more than two languages can be treated in one space at the same time.

In a third step, the collected documents are folded into the cross-lingual space. For example, the documents can be folded into the cross-lingual space according to the folding-in method as described in U.S. Pat. No. 4,839,853, entitled "Computer Information Retrieval Using Latent Semantic Structure," which issued Jun. 13, 1989.

In a fourth step, the closest pairs (sets) of collected documents in the two (or more) languages are identified. This could be the N closest pairs (sets) or all pairs (sets) closer than a given threshold. Both N and the threshold can be determined heuristically.

In a fifth step, the pairs (sets) of documents identified in the fourth step are treated as additional parallel documents in creating a next iteration of the cross-lingual space. That is, these identified document pairs are treated as additional document pairs (sets) for matrix creation and singular value decomposition (SVD) processing in creating a new iteration of the cross-lingual space as in the first step.

In a sixth step, the fourth and fifth steps are repeated until no pairs (sets) are closer than a threshold (such as, an empirically determined threshold). In an alternative implementation of the sixth step, the second through fifth steps are repeated until there are no pairs closer than the threshold.

It is to be appreciated that the above-described method creates robust cross-lingual conceptual representation spaces and may be used in conjunction with any of the above-described methods in which a cross-lingual space is employed.

Being able to use monolingual data to create auxiliary structures for machine translation potentially makes several orders of magnitude more information available. Typically only thousands to hundreds of thousands of pages of true parallel text are available for most languages. However, there could be millions to hundreds of millions of pages of monolingual text available.

X. Example Computer System Implementation

Figure 9:
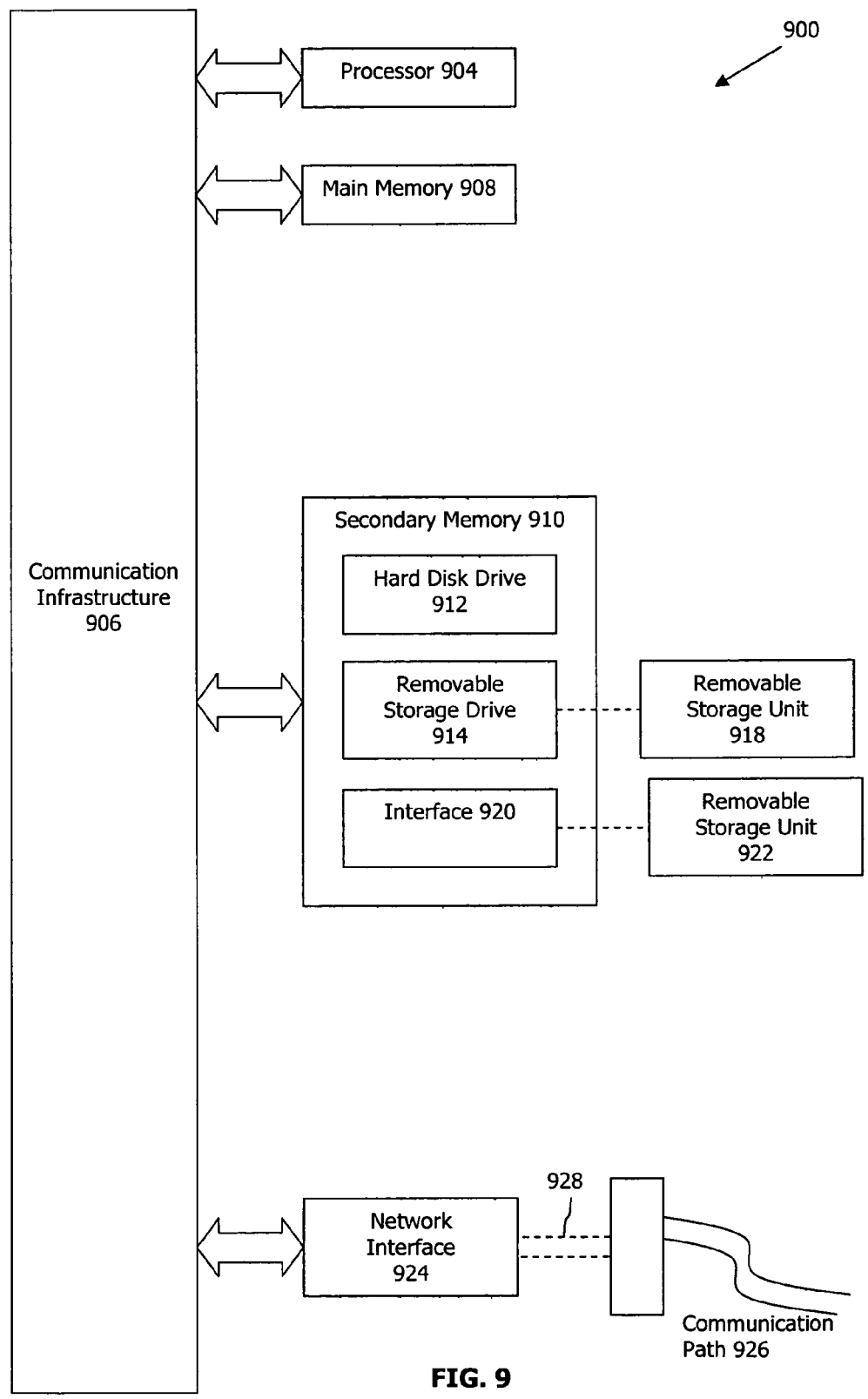
FIG. 9 is a block diagram of a computer system on which an embodiment of the present invention may be executed.

Various aspects of the present invention can be implemented by software, firmware, hardware, or a combination thereof. FIG. 9 illustrates an example computer system 900 in which an embodiment of the present invention, or portions thereof, can be implemented as computer-readable code. For example, the methods illustrated by flowcharts 500, 600, 700, and 800 of FIGS. 5, 6, 7, and 8, respectively, can be implemented in system 900. Various embodiments of the invention are described in terms of this example computer system 900. After reading this description, it will become apparent to a person skilled in the relevant art how to implement the invention using other computer systems and/or computer architectures.

Computer system 900 includes one or more processors, such as processor 904. Processor 904 can be a special purpose or a general purpose processor. Processor 904 is connected to a communication infrastructure 906 (for example, a bus or network).

Computer system 900 also includes a main memory 908, preferably random access memory (RAM), and may also include a secondary memory 910. Secondary memory 910 may include, for example, a hard disk drive 912 and/or a removable storage drive 914. Removable storage drive 914 may comprise a floppy disk drive, a magnetic tape drive, an optical disk drive, a flash memory, or the like. The removable storage drive 914 reads from and/or writes to a removable storage unit 918 in a well known manner. Removable storage unit 918 may comprise a floppy disk, magnetic tape, optical disk, etc. which is read by and written to by removable storage drive 914. As will be appreciated by persons skilled in the relevant art(s), removable storage unit 918 includes a computer usable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Communications interface 924 may include a modem, a network interface (such as an Ethernet card), a communications port, a PCMCIA slot and card, or the like. Software and data transferred via communications interface 924 are in the form of signals 928 which may be electronic, electromagnetic, optical, or other signals capable of being received by communications interface 924. These signals 928 are provided to communications interface 924 via a communications path 926. Communications path 926 carries signals 928 and may be implemented using wire or cable, fiber optics, a phone line, a cellular phone link, an RF link or other communications channels.

In this document, the terms "computer program medium" and "computer usable medium" are used to generally refer to media such as removable storage unit 918, removable storage unit 922, a hard disk installed in hard disk drive 912, and signals 928. Computer program medium and computer usable medium can also refer to memories, such as main memory 908 and secondary memory 910, which can be memory semiconductors (such as DRAMs, etc.). These computer program products are means for providing software to computer system 900.

Computer programs (also called computer control logic) are stored in main memory 908 and/or secondary memory 910. Computer programs may also be received via communications interface 924. Such computer programs, when executed, enable computer system 900 to implement the present invention as discussed herein. In particular, the computer programs, when executed, enable processor 904 to implement the processes of the present invention, such as the steps in the methods illustrated by flowchart 500 of FIG. 5, flowchart 600 of FIG. 6, flowchart 700 of FIG. 7, and flowchart 800 of FIG. 8 discussed above. Accordingly, such computer programs represent controllers of the computer system 900. Where the invention is implemented using software, the software may be stored in a computer program product and loaded into computer system 900 using removable storage drive 914, interface 920, hard drive 912 or communications interface 924.

The invention is also directed to computer products comprising software stored on any computer useable medium. Such software, when executed in one or more data processing devices, causes a data processing device(s) to operate as described herein. Embodiments of the invention employ any computer useable or readable medium, known now or in the future. Examples of computer useable mediums include, but are not limited to, primary storage devices (such as, any type of random access memory), secondary storage devices (such as, hard drives, floppy disks, CD ROMs, ZIP disks, tapes, magnetic storage devices, optical storage devices, MEMS, nanotechnological storage device, etc.), and communication mediums (such as, wired and wireless communications networks, local area networks, wide area networks, intranets, etc.).

XI. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A method, implemented by a computer, for automatically translating text, comprising:
(a) generating a conceptual representation space based on source-language documents and target-language documents, wherein respective terms from the source-language documents and the target-language documents have a representation in the conceptual representation space, wherein a polysemous term from the source-language documents has a plurality of representations in the conceptual representation space, each representation of the polysemous term corresponding to a sense of the polysemous term, wherein generating a conceptual representation space comprises generating a Latent Semantic Indexing (LSI) space;
- (b) representing a new source-language document in the conceptual representation space, wherein a subset of terms in the new source-language document is represented in the conceptual representation space, such that each term in the subset has a representation in the conceptual representation space;
- (c) comparing the plurality of representations of the polysemous term to the representation of a first term in the new source-language document to identify one sense of the polysemous term that is similar to the first term above a threshold;
- (d) automatically translating the first term in the new source-language document into a corresponding target-language term based on the one sense of the polysemous term identified in step (c) to provide a machine translation of the new source-language document; wherein step (d) comprises
    - (d1) subdividing sentences that are longer than a threshold into logically coherent segments, and
    - (d2) automatically translating a term in one of the logically coherent segments into a corresponding target-language term contained in at least one target-language document based on a similarity between the representation of the term and the representation of the corresponding target-language term;
- (e) identifying an idiomatic expression contained in at least one of the source-language documents, wherein identifying an idiomatic expression contained in at least one of the source-language documents comprises:
    identifying at least one candidate sequence of words;
    generating (i) a representation of the at least one candidate sequence of words in the conceptual representation space, and (ii) a representation of each word in the at least one candidate sequence of words in the conceptual representation space;
    comparing the representation of the at least one candidate sequence of words with the representation of each word in the at least one candidate sequence of words to determine a difference thereof; and
    identifying the at least one candidate sequence of words as an idiomatic expression if the difference is greater than a threshold;
- (f) generating a representation of the idiomatic expression in the conceptual representation space; and
- (g) automatically translating the idiomatic expression into a target-language term or expression based on a similarity between the representation of the idiomatic expression and the representation of the target-language term.

2. The method of claim 1, further comprising:
- (e) repeating step (d) for each term in the new source-language document.

3. The method of claim 1, further comprising:
repeating step (d2) for each term in each of the logically coherent segments.

4. A computer program product comprising a computer readable storage medium having control logic stored therein for causing a computer to automatically translate text, the control logic comprising:
    computer readable first program code that causes the computer to generate a conceptual representation space based on source-language documents and target-language documents, wherein respective terms from the source-language documents and the target-language documents have a representation in the conceptual representation space, wherein a polysemous term from the source-language documents has a plurality of representations in the conceptual representation space, each representation of the polysemous term corresponding to a sense of the polysemous term, wherein the conceptual representation space is a Latent Semantic Indexing (LSI) space;
    computer readable second program code that causes the computer to represent a new source-language document in the conceptual representation space, wherein a subset of terms in the new source-language document is represented in the conceptual representation space, such that each term in the subset has a representation in the conceptual representation space;
    computer readable third program code that causes the computer to compare the plurality of representations of the polysemous term to the representation of a first term in the new source-language document to identify one sense of the polysemous term that is similar to the first term above a threshold;
    computer readable fourth program code that causes the computer to automatically translate the first term in the new source-language document into a corresponding target-language term based on the one sense of the polysemous term identified by the computer readable third program code to provide a machine translation of the new source-language document; wherein the computer readable fourth program code comprises
        computer readable eighth program code that causes the computer to subdivide sentences that are longer than a threshold into logically coherent segments, and
        computer readable ninth program code that causes the computer to automatically translate a term in one of the logically coherent segments into a corresponding target-language term contained in at least one target-language document based on a similarity between the representation of the term and the representation of the corresponding target-language term;
    computer readable fifth program code that causes the computer to identify an idiomatic expression contained in at least one of the source-language documents, wherein the computer readable fifth program code comprises:
        code that causes the computer to identify at least one candidate sequence of words;
        code that causes the computer to generate (i) a representation of the at least one candidate sequence of words in the conceptual representation space, and (ii) a representation of each word in the at least one candidate sequence of words in the conceptual representation space;
        code that causes the computer to compare the representation of the at least one candidate sequence of words with the representation of each word in the at least one candidate sequence of words to determine a difference thereof; and
        code that causes the computer to identify the at least one candidate sequence of words as an idiomatic expression if the difference is greater than a threshold;
    computer readable sixth program code that causes the computer to generate a representation of the idiomatic expression in the conceptual representation space; and
    computer readable seventh program code that causes the computer to automatically translate the idiomatic expression into a target-language term or expression based on a similarity between the representation of the idiomatic expression and the representation of the target-language term.

5. The computer program product of claim 4, further comprising:
 code that causes the computer to repeat the computer readable fourth program code for each term in the new source-language document.

6. The computer program product of claim 4, wherein the computer readable fourth program code further comprising:
 code that causes the computer to repeat the computer readable ninth program code for each term in each of the logically coherent segments.

* * * * *